F. J. ENGLISH & G. FLOCK.
AUTOMATIC AUTOMOBILE SIGNAL.
APPLICATION FILED MAR. 21, 1916.
1,270,714.
Patented June 25, 1918.
2 SHEETS—SHEET 1.
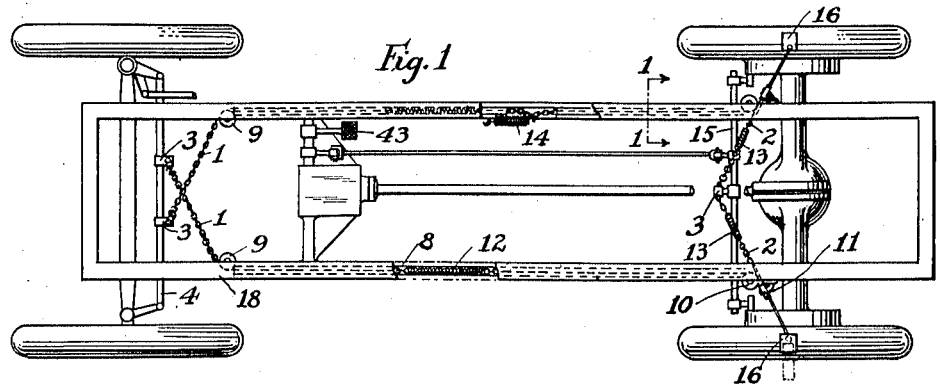
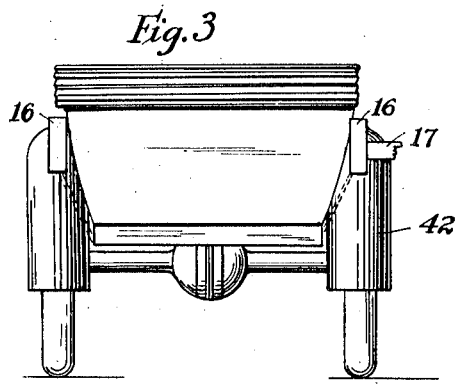
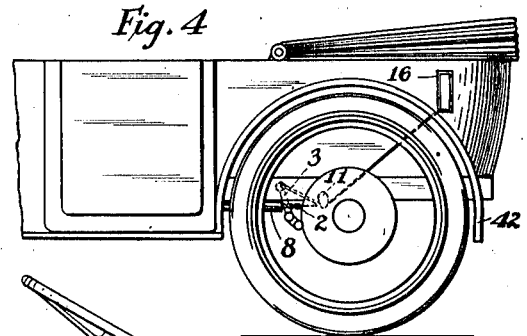
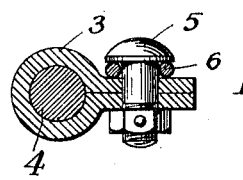
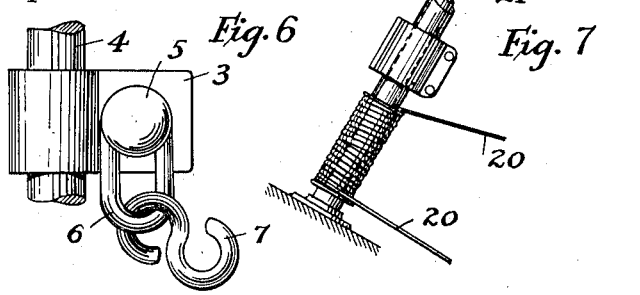
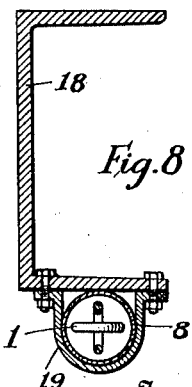
Inventors
Frederick J. English and George Flock
By their Attorney
Harry Jacobson

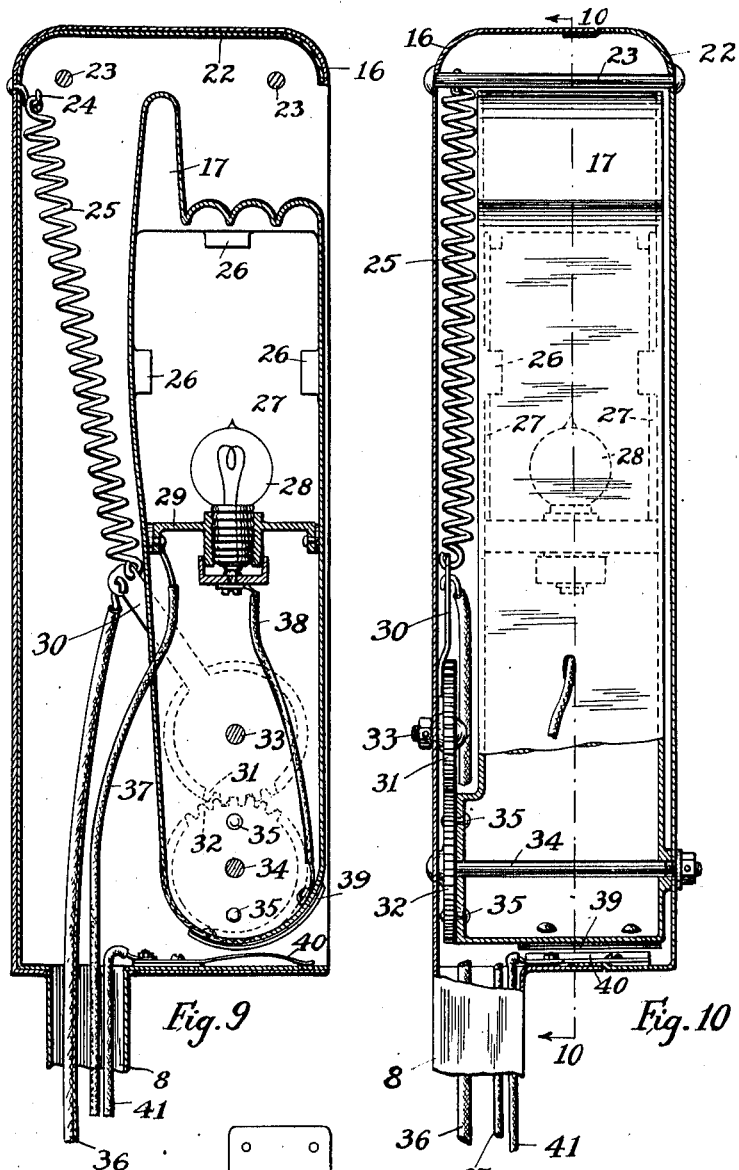

UNITED STATES PATENT OFFICE.

FREDERICK J. ENGLISH AND GEORGE FLOCK, OF NEW YORK, N. Y., ASSIGNORS OF ONE-THIRD TO HARRY JACOBSON, OF NEW YORK, N. Y.

AUTOMATIC AUTOMOBILE-SIGNAL.

1,270,714.            Specification of Letters Patent.     Patented June 25, 1918.

Application filed March 21, 1916. Serial No. 85,569.

*To all whom it may concern:*

Be it known that we, FREDERICK J. ENGLISH and GEORGE FLOCK, citizens of the United States, and residents of the city of New York, in the county of Kings and State of New York, have invented certain new and useful Improvements in Automatic Automobile-Signals, of which the following is a specification.

This invention relates to signaling devices for automobiles and especially those intended to replace hand signaling on turning, slowing down or stopping the vehicle.

One of the objects of this invention is to provide a simple signal device for use both day and night, which will act automatically without any thought or action on the part of the driver other than the ordinary acts of driving, so that the driver may give his entire attention to driving.

A further object of this invention is the provision of a signaling device which can be depended on to act properly and which cannot readily be tampered with.

To attain these objects, we employ the mechanism shown in its preferred form in the accompanying drawings, in which, Figure 1 is a diagrammatic plan view of the chassis of an automobile showing how our device may be connected to the steering gear and to the brake applying mechanism.

Fig. 2 is a side view of the flexible member of our device showing the manner of attaching said member to the automobile frame.

Fig. 3 is a rear view of an automobile showing the signaling portion of our device attached in its preferred position, and Fig. 4 is a side view of the same.

Fig. 5 is a section and Fig. 6 is a plan of the means used for attaching the flexible member to the steering tie rod or to the brake arm shaft.

Fig. 7 is a front view of a steering wheel and column showing a modified form of connection for the flexible members and steering mechanism.

Fig. 8 is a section on line 1—1 of Fig. 1 showing the means for attaching the tube inclosing the flexible member to the automobile frame.

Fig. 9 is a front view and partial section on line 10—10 of Fig. 10 of the signal hand and the means for rotating said hand, the front part of the casing covering said hand being removed.

Fig. 10 is a side view of the mechanism shown in Fig. 9.

Fig. 11 is a front view of the signal hand and casing showing said hand rotated out of the casing into its extended position.

The devices heretofore proposed for signaling, depend on some special act of the driver for their operation other than the ordinary acts of driving.

By connecting our device both to the steering and the brake applying mechanisms, all necessity for signaling action on the part of the driver is eliminated, since the mere turning of the steering wheel or the usual necessary depression of the brake pedal rotates the signal hands into a position readily visible rearwardly of the automobile.

The signaling portion of our device is inclosed by the casing 16 preferably made of two parts 16 and 22, each of sheet metal, one of said parts 22 being shaped to slidably fit into the other part 16, both parts being held together by bolts as 23 and bolt shaft 34. The signal box pointer 17 is made preferably in the shape of a hand, is mounted on shaft 34 and is made preferably of sheet metal. The sides of said hand are partly cut away to expose the sections of colored glass 27, which are held in position to cover the cut-away parts of the sides of hand 17 by projections 26. An electric light bulb 28 is held in cross piece 29, which is suitably held inside of said signal hand. Wire 38 runs from said bulb down the inside of said hand 17 to the metallic contact plate 39 which is attached to the lower end of said hand slightly eccentric to shaft 34 and properly insulated from said hand 17. Wire 37 runs from bulb 28 through the wall of hand 17 to a source of current not shown. On the bottom of casing 16 is metallic contact spring 40 suitably insulated from said casing, a wire 41 being led from said spring to the source of current. A gear wheel 32 is attached to signal hand 17 in such a manner that it may rotate about shaft 34, a second gear wheel 31 being mounted on stud 33 and adapted to engage said wheel 32. Lever 30, attached at one end to wheel 31, is attached at its other end to spring 25 which is hung from hook 24 at the upper end of casing member 22. A flexible connecting member as 36, attached to lever 30 at one end, is suitably attached at its other end to the steering mechanism and to the brake applying mechanism of the automobile.

While a small link chain as 1 is preferred, it is understood that suitable cable as 36 may be used for the purpose of connecting lever 30 with the steering and brake mechanisms. The tube 8 partly filled with grease or other lubricant is fastened throughout the major portion of its length to the under side of channel 18 of the automobile frame by clasp 19, and incloses chain 1, said tube being shaped at certain points to revolubly hold pulleys as 9, 10 and 11, about which said chain passes when changes in its direction occur. One end of said chain is attached to lever 30, the other end being attached to some part of the steering mechanism in such a manner that rotation of the steering wheel will pull the chain to operate the signal. The preferred manner of attaching chain 1 is by means of S-hook 7 and link 6 to a clip as 3 held to the cross connecting tie-rod 4 by a bolt 5, the chain for the right hand signal being attached near the left hand end of rod 4 and that for the left hand signal to the right hand end of rod 4. Instead of connecting the ends of chain 1 to the tie-rod 4, the ends 20 of said chains 1 may be given a few turns in opposite directions around the lower end of steering post 21, if said post is sufficiently long.

A section of chain 1 is parted to allow the insertion of spring 12 for the steering mechanism connection, a similar spring 13 being inserted for the brake connection. Said springs 12 and 13 are adapted to fit inside tube 8. A branch section 2 of chain is attached from each of chains 1 to crank 3 on brake shaft 15, so that rotation of shaft 15 will tension chains 2 and 1.

The casing 16 containing the signal hand 17 and the hand rotating mechanism is mounted preferably on mud guard 42 as shown in Figs. 3 and 4. Rotation of the steering wheel to the left moves tie-rod 4 to the right, tensioning the chain to the left signal and loosening the chain to the right signal. Tension in chain 1 pulls lever 30 down against the action of spring 25 thereby rotating wheel 31 and therethrough wheel 32 on pointer hand 17, said pointer thereby being rotated out of casing 16. Turning the steering wheel to the right similarly causes the right hand pointer to rotate from its casing. In the modified form of connection in which cables or chains are wrapped around post 21, turning the steering wheel to the left will loosen one chain and tighten the other, the opposite effect being obtained when the steering wheel is turned to the right.

Depression of brake pedal 43 results in turning brake shaft 15, thereby rotating crank 3 and tensioning both of chains 1 whereby both pointers 17 are rotated from their casings. In many cases, when a corner is to be turned by an automobile in traffic, it is first necessary to apply the brakes, thereby extending both pointers, this acting as a preliminary warning. When the steering wheel is turned, the proper pointer is again extended and held out until the turn is completed. Small jars on the road tending to turn the front wheels are not communicated to the pointers as the springs 12 will tend to be extended by such short quick pulls.

In case the brakes are suddenly and firmly applied and at the same time the steering wheel is turned, the extraordinary strain on chains 1 is taken up by said springs 12 without injury to the pointer rotating mechanism. Take-up spring 14 attached to the chain and to the outside of tube 8 keeps said chain taut and in working commission and also prevents annoying rattling when the car is in motion. Grease or other lubricant is used in tube 8 to facilitate easy movement of the chain in the tube.

It can readily be seen from the above that though two sets of signals and connections are used, when turning only the pointer on the side toward which the turn is being made is extended, while both pointers are extended on stopping or slowing down by braking.

It is also evident that the driver's attention need not be diverted from operation of the automobile to signaling, since the signaling is automatic with our device; that by inclosing the signaling mechanism in a casing and the connections in tubes the device cannot readily be tampered with and disarranged; that the device is sufficiently simple so that it does not readily get out of order, and can be depended upon to operate, and that though the preferred position of the signal is on the rear mud guards 42, any other convenient position may be substituted without departing from the scope of our invention.

What we claim is:

In a device of the class described, in combination an automobile body having a frame, a pair of spaced-apart signal blades pivotally mounted upon said body at its rear end, cables for operating said blades, angularly-arranged pulleys mounted on said frame over which said cables are trained so as to extend at a downward inclination, parallel tubes secured to said frame, said cables passing through said tubes, coiled springs forming intermediate resilient connections for said cables, a coiled spring fixedly secured to said frame at one end, a portion of one of said cables being movable externally of one tube and having the other end of said last-named spring secured thereto, and means connected to the free ends of said cables for pulling either of said cables and slacking the other so as to operate but one signal blade at a time.

Signed at the city of New York, in the county of Kings and State of New York, this 18 day of March A. D. 1916.

FREDERICK J. ENGLISH.
GEORGE FLOCK.